(12) United States Patent
Kurtz

(10) Patent No.: US 6,293,154 B1
(45) Date of Patent: Sep. 25, 2001

(54) VIBRATION COMPENSATED PRESSURE SENSING ASSEMBLY

(75) Inventor: Anthony D. Kurtz, Ridgewood, NJ (US)

(73) Assignee: Kulite Semiconductor Products, Leonia, NJ (US)

( * ) Notice: Subject to any disclaimer, the term of this patent is extended or adjusted under 35 U.S.C. 154(b) by 0 days.

(21) Appl. No.: 09/459,238

(22) Filed: Dec. 10, 1999

(51) Int. Cl.$^7$ ...................................................... G01L 9/06
(52) U.S. Cl. ................................................................ 73/727
(58) Field of Search ............................ 73/708, 720, 721, 73/726, 727; 338/4, 42

(56) References Cited

U.S. PATENT DOCUMENTS 3,930,823  1/1976  Kurtz et al. .
4,222,277 * 9/1980  Kurtz et al. ............................ 73/721
5,955,771  9/1999  Kurtz et al. .

* cited by examiner

Primary Examiner—William Oen
(74) Attorney, Agent, or Firm—Arthur L. Plevy; Duane, Morris & Heckscher

(57) ABSTRACT

A pressure sensing device for producing an output proportional to an applied pressure irrespective of vibration and acceleration of the device, the device including: a first deflecting diaphragm formed in a first wafer and including a first plurality of piezoresistors mounted thereon, the first diaphragm being responsive to the applied pressure and vibration of the device; and, a second deflecting diaphragm formed in the first wafer and including a second plurality of piezoresistors mounted thereon, the second diaphragm being responsive only to vibration of the device; wherein, the first and second pluralities of piezoresistors are electrically coupled together to provide a common output such that they cooperatively at least partially cancel a portion of the common output associated with the vibration of the device.

20 Claims, 4 Drawing Sheets

VIBRATION COMPENSATED PRESSURE SENSING ASSEMBLY

FIELD OF INVENTION

The present invention relates to pressure sensing devices and more particularly to a pressure sensing device adapted for use in environments which subject the device to harsh vibrations or accelerations.

BACKGROUND OF INVENTION

Semiconductor pressure transducers are frequently used in applications which require operation in environments that subject the transducers to substantial vibrations and/or accelerations. A typical transducer includes a piezoresistive sensor device formed on a diaphragm which deflects in response to an applied pressure. Errors can be caused by undesired vibrations and/or accelerations. These errors are due to undesirable deflection of the sensor diaphragm in response to these undesired vibrations and accelerations. A typical application is the measuring of pressures inside of a jet-engine, where a sensor is exposed to substantial vibrations, accelerations and decelerations. It is desirable to compensate the stress sensing network of piezoresistors used in such applications to eliminate vibration and/or acceleration induced errors.

Accordingly, it is an object of the invention to provide a pressure sensing device adapted to accurately measure pressure in an environment which subjects the device to substantial vibrations and accelerations.

SUMMARY OF INVENTION

A pressure sensing device for producing an output proportional to an applied pressure irrespective of vibration and acceleration of the device, the device including: a first deflecting diaphragm formed in a first wafer and including a first plurality of piezoresistors mounted thereon or otherwise formed therein, the first diaphragm being responsive to the applied pressure and also vibration of the device; and, a second deflecting diaphragm formed in the first wafer and including a second plurality of piezoresistors mounted thereon or otherwise formed therein, the second diaphragm being responsive only to the vibration of the device; wherein, the first and second pluralities of piezoresistors are electrically coupled together to provide a common output such that they cooperatively at least partially cancel a portion of the common output associated with the vibration of the device.

DETAILED DESCRIPTION OF THE INVENTION

Generally, the device according to the present invention includes a single "chip" or piece of silicon containing at least two stress deflecting diaphragms. There is a half Wheatstone bridge including two piezoresistors formed in series on each diaphragm. One piezoresistor of each pair increases its resistance with a positive stress normal to the plane of the diaphragm and the other one decreases its resistance with a positive stress normal to the plane of the diaphragm. The two diaphragms are both exposed to the vibrational and acceleration stresses, however only one diaphragm is exposed to a pressure to be measured. The half-bridges from each diaphragm are electrically coupled to form a full bridge such that for a positive stress applied substantially normal to the diaphragm, the bridge output of one half-bridge will subtract from the other. Thus, the signal output is responsive to the pressure as applied to one diaphragm while the signal response to vibration applied to both diaphragms is canceled.

More particularly, if the two deflecting diaphragms have a substantially same size and thickness, and the piezoresistive characteristics of each half bridge are substantially the same, the output voltages from the same positive normal stress applied to each diaphragm will sum to zero. If however, both diaphragms are subjected to the same stress by vibration or acceleration and only one of the two diaphragms is also subjected to a positive pressure normal to that diaphragm, a voltage output from the full Wheatstone bridge will result. The resulting voltage is proportional to the positive normal pressure applied to the one diaphragm. Thus, such a dual device can provide an output proportional to an applied pressure to be measured and independent of vibrations and/or accelerations as these signal components are canceled.

Figure 1:
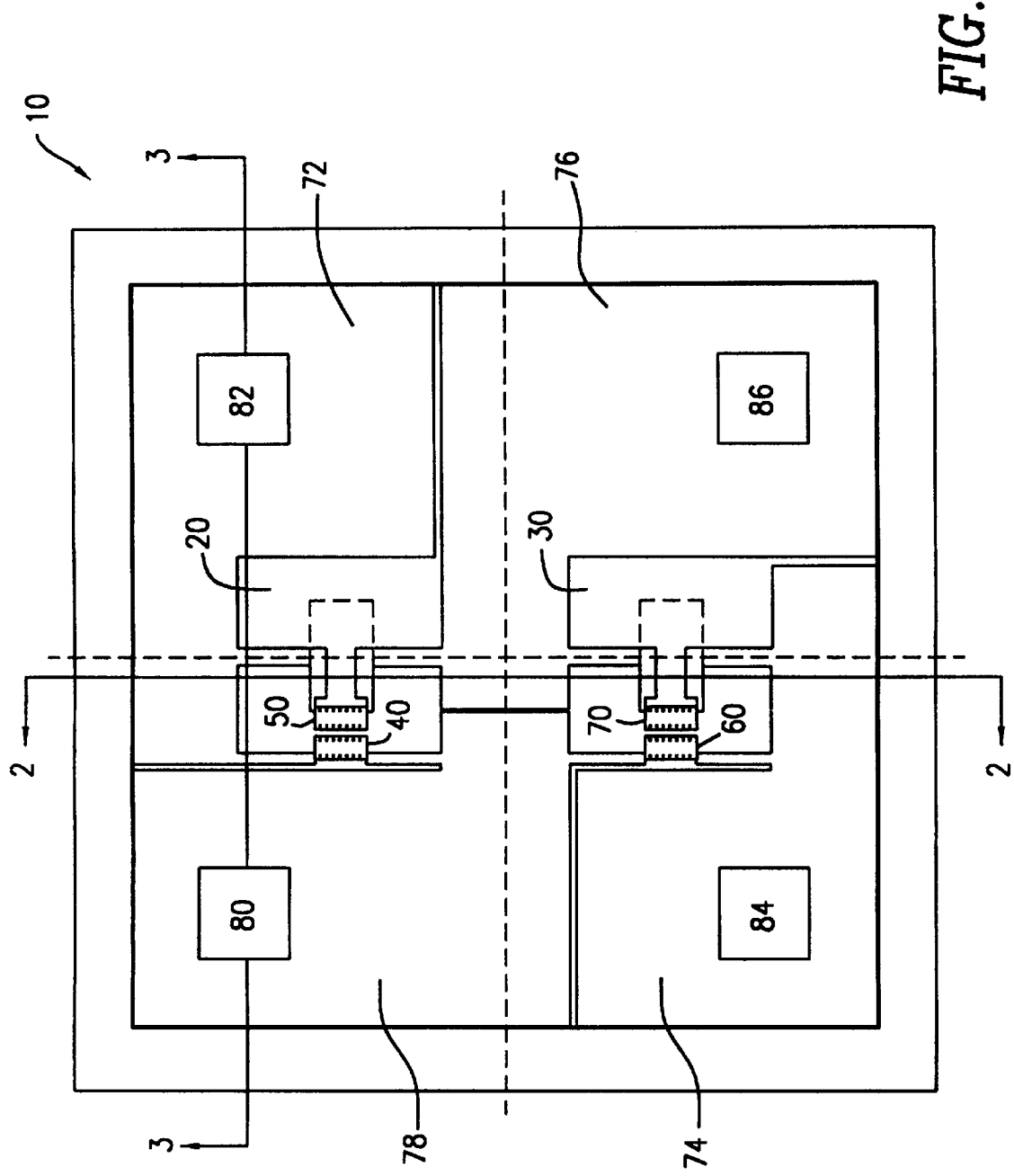
FIG. 1 illustrates a partial plan-view of a pressure sensing device according to the present invention.
Figure 2:
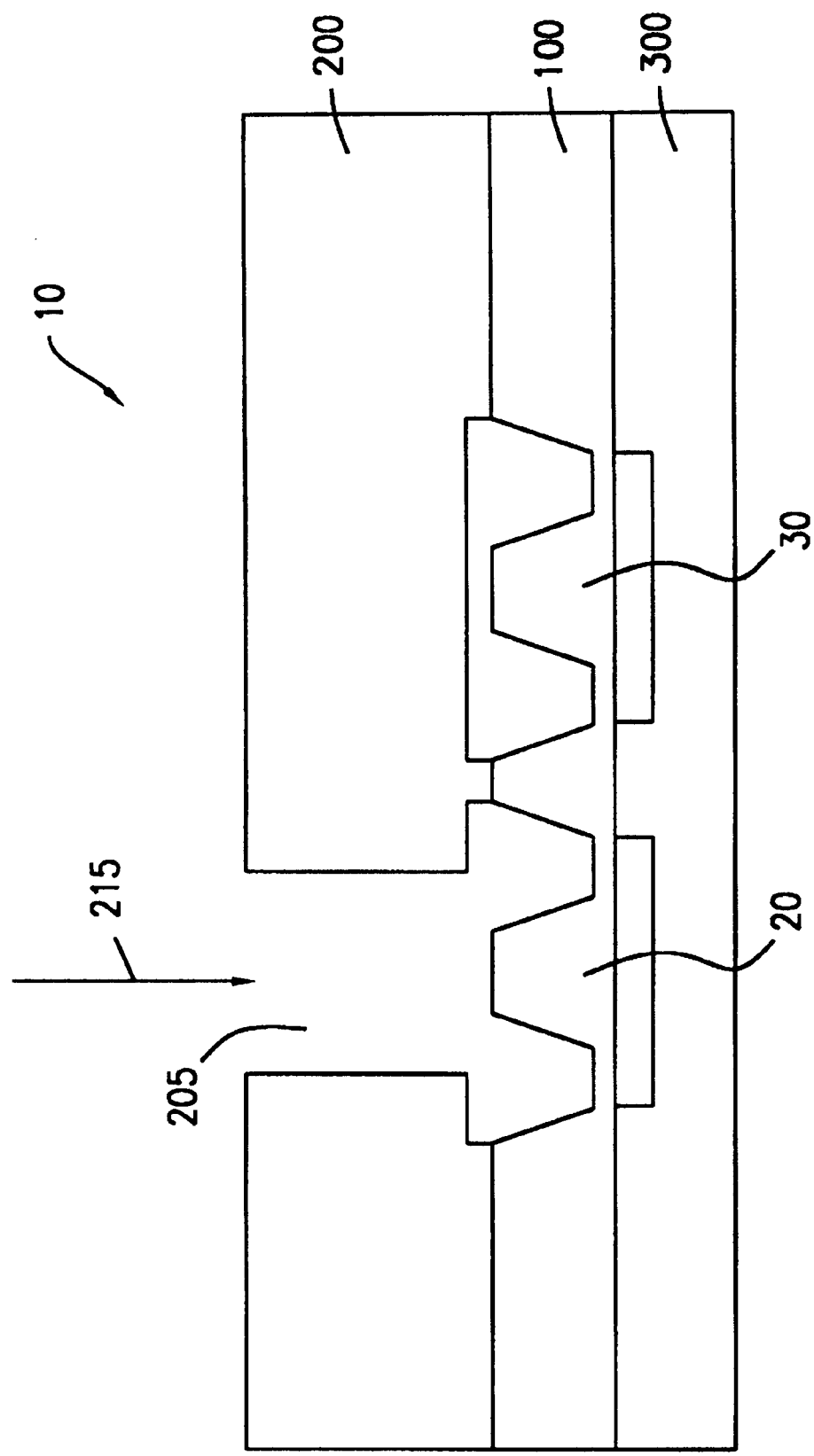
FIG. 2 illustrates cross-section 2—2 of the device of FIG. 1.
Figure 3:
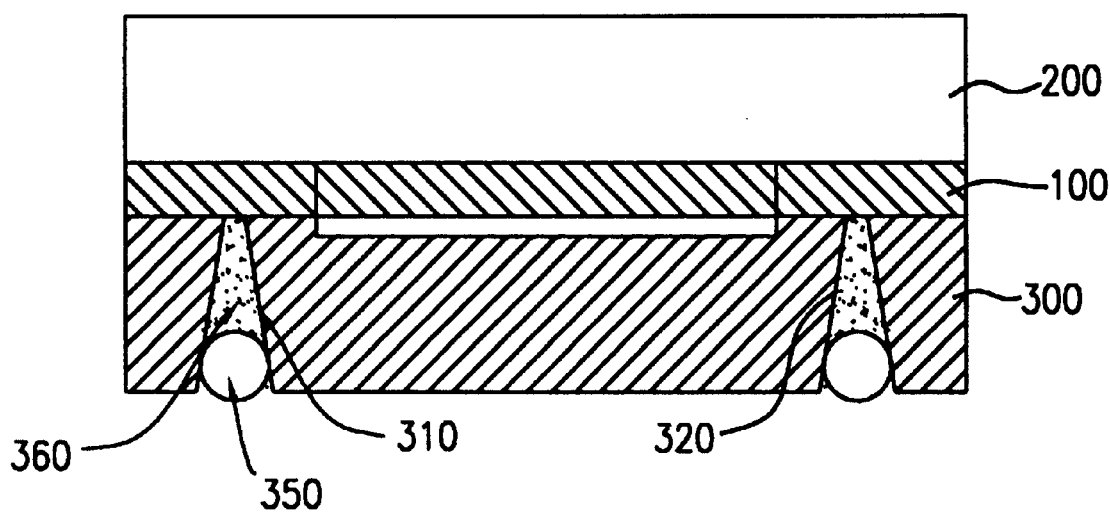
FIG. 3 illustrates cross-section 3—3 of the device of FIG. 1.
Figure 4:
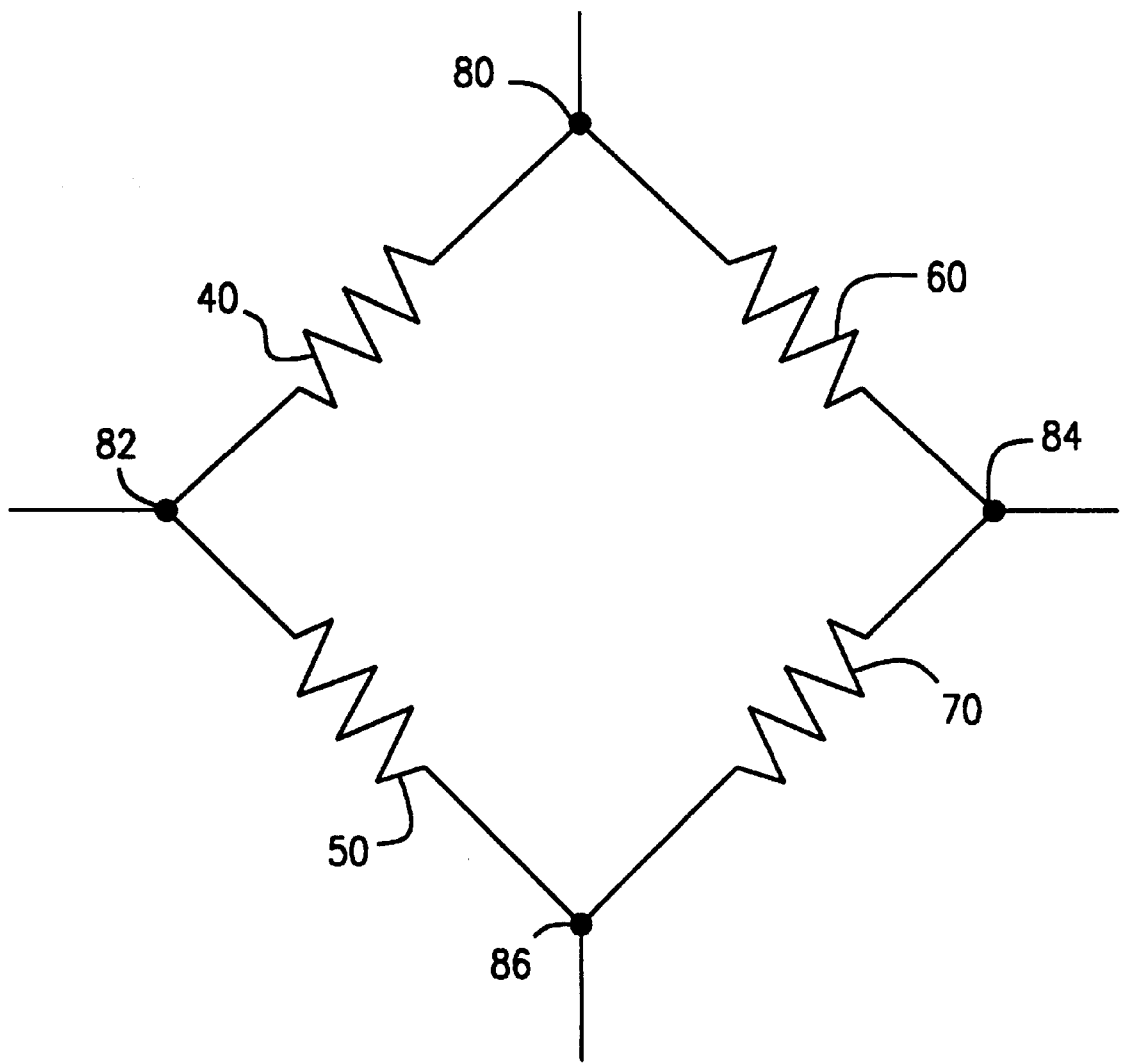
FIG. 4 illustrates an electrical representation of the device according to the present invention.

Referring now to FIGS. 1–4, like references identify like elements of the invention. FIG. 1 illustrates a partial plan-view of a pressure sensing device 10 according to the present invention. In the preferred embodiment, two separate deflectable diaphragms 20, 30 each respectively containing two piezoresistors 40, 50 and 60, 70 electrically coupled in series are formed in wafer 100. Piezoresistors 40, 60 each decrease with positive normal stress and piezoresistors 50, 70 each increase with positive normal stress. The piezoresistors 40, 50, 60, 70 are electrically interconnected to form a full bridge such as is illustrated in FIG. 4.

Referring now also to FIG. 2, therein is illustrated cross-section 2—2 of the device 10 of FIG. 1. The two deflecting diaphragms 20, 30 are in turn covered by another member 200 which has therein an aperture 205 accessible to the first diaphragm 20 but not the second diaphragm 30. Thus, application of a pressure 215 on the covering member 200 will cause the first diaphragm 20 to deflect, while application of various vibration or acceleration stresses to the device 10 will cause both diaphragms 20, 30 to deflect. If both diaphragms 20, 30 are formed in sufficient proximity to one another, the deflection caused in each of the diaphragms 20, 30 by vibration and/or acceleration will be by the same amount. Thus, the device 10 is responsive to normal pressure applied to the cover 200 but not to vibration of or acceleration of the device 10.

Commonly assigned U.S. Pat. No. 5,955,771, entitled "SENSORS FOR USE IN HIGH VIBRATIONAL APPLICATIONS AND METHODS FOR FABRICATING SAME", issued Sep. 21, 1999, the entire disclosure of which is hereby incorporated by reference as if being set forth in its entirety, teaches a hermetically sealed sensor which can be advantageously used with the present invention. It is understood that other structures can be used as well though. The resulting structure will be an ultra-thin sensor without external leads being suitable for direct mounting to a structure such as a fan blade in a jet engine, for example. Furthermore, such a sensor is suitable for high temperature operation. For instance, such a device could be mounted on an appropriate pre-glazed kovar "shim" and then welded directly to a fan blade of a jet engine for example or to the blade of a helicopter.

The wafer 100 is preferably fabricated using the method disclosed in commonly assigned U.S. Pat. No. 3,930,823, entitled, "HIGH TEMPERATURE TRANSDUCERS AND HOUSING INCLUDING FABRICATION METHODS", the entire disclosure of which is hereby incorporated by reference as if being set forth herein in its entirety. Alternatively, any conventional wafer processing technique which enable dielectically isolated piezoresistive sensor elements 40, 50, 60, 70 to be formed on semiconductor material using dielectric films of $SiO_2$ or the like could be used. The elements 40, 50, 60, 70 are preferably formed of highly doped (P+) silicon. It is understood that a number of such sensors can be made at the same time on a large substrate. The circuit nodes of the Wheatstone bridge include four oversized P+ diffused silicon electrical contact areas or fingers 72, 74, 76, 78 which are mainly located in non-active areas of the wafer 100. It should be understood the active portions of the wafer 100 can be defined as those portions defined by the diaphragms 20 and 30, as these portions deflect. The remaining portions are referred to as the non-active regions. The term "finger" is used to indicate those areas 72, 74, 76, 78 which project from the piezoresistors 40, 50, 60, 70 to the metal contacts 80, 82, 84, 86. The metal contacts 80, 82, 84, 86 within the contact area are preferably rectangular in shape, although other shapes could of course be utilized.

Referring now also to FIG. 3, therein is illustrated a cross-section 3—3 of the device 10 of FIG. 1. A glass wafer 300 is preferably bonded to and can be used to electrically contact the fingers 72, 74, 76, 78. Wafer 300 preferably includes four apertures 310, 320, 330, 340 disposed in areas which will overlie the metalized portions 80, 82, 84, 86 of the contacts 72, 74, 76, 78 when wafer 300 is secured or bonded to wafer 100. Preferably, apertures 310, 320, 330, 340 on the side of the glass that contact the silicon wafer 100 are just slightly larger than the metalized regions 80, 82, 84, 86 but smaller than the width of the fingers 72, 74, 76, 78 to insure proper sealing with the wafer 100. However, the apertures 310, 320, 330 and 340 are preferably tapered in dimension to accommodate and secure small metallic spheres 350. In this case, the glass wafer 300 is preferably electrostatically bonded to the silicon wafer 100. The apertures 310, 320, 330 and 340 are preferably filled with an unfired metal glass frit 360 and small spheres or balls of metal 350 are inserted into the unfired frit so as to leave a small portion of each sphere 350 protruding past an outermost edge of the glass wafer 350. Of course, other shapes of small metal could be used instead of spheres 350. The structure can then be fired to make an electrical contact between the spheres 350 and the metalized regions 80, 82, 84, 86 of the fingers 72, 74, 76, 78.

On the other hand, successively filling and firing the glass-metal frits insures that after firing the glass-metal frit extend beyond the apertures so spheres 350 are not needed.

Referring now also to FIG. 4, therein is illustrated an electrical representation of the device according to the present invention. Basically, as set forth, it includes piezoresistive elements 40, 50 from diaphragm 20 being coupled in a full bridge configuration with piezoresistive elements 60, 70 of diaphragm 30. Accordingly, they cooperatively cancel any output of the full bridge resulting from common exposure of both diaphragm 20 and 30, i.e. output attributable to vibration and/or acceleration of the device 10 for example.

Although the invention has been described and pictured in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

I claim:

1. A pressure sensing device for producing an output proportional to an applied pressure irrespective of vibration and acceleration of said device, said device comprising:

a wafer including first and second recessed portions respectively defining first and second deflectable diaphragms;

a first plurality of piezoresistors mounted on said first deflectable diaphragm and being responsive to said applied pressure and vibration of said device; and, a second plurality of piezoresistors mounted on said second deflectable diaphragm and being responsive to said vibration of said device;

wherein, said first and second pluralities of piezoresistors are electrically coupled together to provide a common output such that they cooperatively at least partially cancel a portion of said common output associated with said vibration of said device.

2. The device of claim 1, further comprising a covering member including a aperture there through, said covering member being secured to said wafer such that said aperture is above said first diaphragm.

3. The device of claim 2, wherein said covering member isolates said second diaphragm from said applied pressure.

4. The device of claim 3, wherein said first and second diaphragms each respectively include first and second sides, wherein said plurality of piezoresistors of said first pressure transducer are mounted to said first side of said first diaphragm, and said second side of said first diaphragm is exposed to said aperture.

5. The device of claim 4, wherein said plurality of piezoresistors of said second pressure transducer are mounted to said first side of said second diaphragm and said second plurality of piezoresistors are responsive only to said vibration and acceleration of said device.

6. The device of claim 1, wherein one of said plurality of piezoresistors increases in resistance and another of said first plurality of piezoresistors decreases in resistance in response to positive deflection of said first diaphragm.

7. The device of claim 1, wherein physical properties of said first and second diaphragms are substantially identical, and electrical characteristics of each of said first and second pluralities of piezoresistors are substantially identical.

8. The device of claim 1, wherein said first and second diaphragms are formed in sufficiently close proximity to one another they are subjected to nearly identical stresses when said device is exposed to vibrations or accelerations.

9. A pressure sensing assembly comprising:

a wafer including first and second recessed portions respectively forming first and second deflectable diaphragms, and first and second circuit elements each respectively formed on an associated one of said first and second diaphragms, said first and second circuit elements each being adapted to provide an output indicative of an amount of deflection of said associated diaphragm and being electrically coupled together; and, a member including an aperture passing there through, said member being secured to said wafer such that said aperture is positioned above said first diaphragm;

whereby, when said device is exposed to said pressure to be measured, said first diaphragm is exposed to said pressure through said aperture and said output of said first and second circuits at least partially cancel.

10. The apparatus of claim 9, wherein said member isolates said second diaphragm from said applied pressure.

11. The apparatus of claim 10, wherein said first and second diaphragms have substantially identical physical characteristics and are formed in close proximity to one another.

12. The apparatus of claim 11, wherein said first circuit comprises a first plurality of piezoresistive devices and said second circuit comprises a second plurality of piezoresistive devices, and each of said first and second pluralities of piezoresistive devices have substantially identical electrical characteristics.

13. The device of claim 12, wherein one of said first plurality of piezoresistors increases in resistance and another of said first plurality of piezoresistors decreases in resistance in response to positive deflection of said first diaphragm.

14. The device of claim 9, wherein said first diaphragm isolates said first circuit from said aperture.

15. A method for eliminating an undesirable component in an output of a pressure sensing device resulting from vibration or acceleration of said device, said device comprising a plurality of deflectable diaphragms each having a piezoresistive network mounted thereon and being operable to provide a signal indicative of an amount of deflection of said diaphragm on which it is mounted, said method comprising:

simultaneously exposing a first of said diaphragms having a first piezoresistive network mounted thereon to said pressure to be measured while isolating a second of said diaphragms having a second piezoresistive network mounted thereon from said pressure to be measured; and, electrically coupling said first and second piezoresistive networks together so as to provide a common output indicative of said pressure to be measured such that they cooperatively at least partially cancel a portion of said common output associated with said vibration or acceleration.

16. The method of claim 15, wherein said first and second diaphragms are formed in a common wafer in close proximity to one another.

17. The method of claim 15, wherein each of said diaphragms has substantially identical physical characteristics and each of said piezoresistive networks has substantially identical electrical characteristics.

18. The method of claim 15, wherein said first piezoresistive network is formed on said first diaphragm so as to be isolated by said first from said aperture.

19. The method of claim 18, wherein said second piezoresistive network is formed on a same side of said wafer as said first piezoresistive network.

20. The method of claim 19, wherein said first and second piezoresistive networks and said first and second diaphragms are formed such that they are subjected to nearly identical stresses when said device is subjected to vibrations, accelerations and decelerations.

* * * * *